UNITED STATES PATENT OFFICE.

WILLIAM G. ROACH AND ALBERT C. ROACH, OF CINCINNATI, OHIO, ASSIGNORS OF THREE-FIFTHS TO HENRY C. YEISER AND OTTO H. L. WERNICKE, OF CINCINNATI, OHIO.

PROCESS OF COLORING MARBLE, STONE, OR THE LIKE.

SPECIFICATION forming part of Letters Patent No. 700,090, dated May 13, 1902.

Application filed February 17, 1902. Serial No. 94,552. (No specimens.)

*To all whom it may concern:*

Be it known that we, WILLIAM G. ROACH and ALBERT C. ROACH, citizens of the United States, residing at Cincinnati, in the county of Hamilton and State of Ohio, have invented certain new and useful Improvements in the Process of Coloring Marble, Stone, or the Like, of which the following is a full, clear, and exact description.

Our improvements relate to a novel and useful process for artificially coloring and staining blocks of common marble to represent the various marbles of high grade and of such colors as may be desired; and our process consists in so treating the blocks of marble to be colored and in using such solvent or vehicle for the various dyes employed that the coloring-matter may be driven into the pores of the marble and fixed so as to be susceptible of as high a polish as the natural marble which it is desired to imitate and in which the colors shall not fade or disappear under the action of the elements or from use.

In carrying out our process we first heat the slabs of marble in any suitable way, but preferably on steam-tables, to a temperature of about 212° Fahrenheit. While the marble is still hot, we apply our coloring-matter, which is made up of dyes that are oil-soluble.

The dyes, which are preferably anilin dyes, are dissolved in coal-oil and made of the proper consistency to work with a brush. The colors are then applied to the marble to imitate or represent the coloring of the natural stone desired, and the use of the coal-oil as a vehicle on the heated marble surface draws in the coloring-matter to such a depth and so permeates the pores of the marble that the coloring is permanent and is not affected by exposure to the elements or use or cleaning of the marble. In order to effectually set the colors, moreover, while the marble blocks are still hot and the pores open, we coat the surface with paraffin, which at once soaks in and fixes the coloring-matter. The surplus paraffin is then cleaned from the surface and the blocks allowed to cool, when they are ready for use.

Having thus described our invention, what we claim, and desire to secure by Letters Patent, is—

1. The process of coloring marble stone and the like, which consists in first heating the slabs to a temperature of about 212° Fahrenheit, and then applying the dyes dissolved in coal-oil to permeate the pores of the material; substantially as described.

2. The process of coloring marble stone and the like, which consists in first heating the slabs to a temperature of about 212° Fahrenheit, and then applying the dyes dissolved in coal-oil to permeate the pores of the material, then coating the surface with paraffin to fix the colors, substantially as described.

WILLIAM G. ROACH.
ALBERT C. ROACH.

Witnesses:
LOUIS H. GOEDHART,
W. S. KYLE.